(12) United States Patent
Shibusawa (10) Patent No.: US 7,221,412 B2
(45) Date of Patent: May 22, 2007

(54) DIGITAL BROADCASTING RECEIVER AND CHANNEL INFORMATION REGISTRATION PROCESSING METHOD IN DIGITAL BROADCASTING RECEIVER

(75) Inventor: Toru Shibusawa, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 645 days.

(21) Appl. No.: 10/043,155

(22) Filed: Jan. 14, 2002

(65) Prior Publication Data

US 2002/0097344 A1 Jul. 25, 2002

(30) Foreign Application Priority Data

Jan. 22, 2001 (JP) ............................. 2001-012723

(51) Int. Cl.
*H04N 5/50* (2006.01)
*H04N 5/44* (2006.01)

(52) U.S. Cl. .................. 348/732; 348/731; 348/725; 348/729; 455/135; 455/185.1; 725/38

(58) Field of Classification Search ............... 348/732, 348/733, 731, 725, 726, 729; 725/38, 68, 725/70; 455/77, 464, 185.1, 186.1, 150.1, 455/154.1, 179.1, 135, 136
See application file for complete search history.

(56) References Cited

U.S. PATENT DOCUMENTS

| | | | | |
|---|---|---|---|---|
| 5,034,819 A | * | 7/1991 | Tsukagoshi ................ | 348/732 |
| 5,065,244 A | * | 11/1991 | Ishiguro et al. ............ | 348/735 |
| 5,087,977 A | * | 2/1992 | Suizu ........................ | 348/732 |
| 5,625,422 A | * | 4/1997 | Kim ........................... | 725/57 |
| 6,128,352 A | * | 10/2000 | Maeda ....................... | 375/316 |
| 6,400,422 B1 | * | 6/2002 | Nakamura ................. | 348/732 |
| 6,421,099 B1 | * | 7/2002 | Oh ............................. | 348/732 |
| 6,600,522 B1 | * | 7/2003 | Kim ........................... | 348/732 |
| 6,678,012 B1 | * | 1/2004 | Belotserkovsky .......... | 348/731 |
| 6,765,628 B1 | * | 7/2004 | Van Houtum et al. ..... | 348/732 |

FOREIGN PATENT DOCUMENTS

| | | |
|---|---|---|
| DE | 2402562 A1 | 7/1975 |
| DE | 2402562 A1 | 7/1975 |
| EP | 0 834 991 A1 | 4/1998 |

(Continued)

OTHER PUBLICATIONS

U.K. Patent Office Search Report Mailed on Aug. 28, 2002.

(Continued)

*Primary Examiner*—David Ometz
*Assistant Examiner*—Jean W. Désir
(74) *Attorney, Agent, or Firm*—Westerman, Hattori, Daniels & Adrian, LLP.

(57) ABSTRACT

Disclosed in a digital broadcasting receiver comprising first means for performing pre-scan processing for successively tuning in on channels previously set, to examine whether or not a received signal on each of the channels is of a predetermined quality or more, and temporarily registering the channel numbers of the channels on which the received signals are of the predetermined quality or more in a storage device as receivable channel candidates, and second means for performing normal scan processing for successively tuning in on the receivable channel candidates temporarily registered in the storage device by the first means, to acquire and register necessary channel information.

8 Claims, 7 Drawing Sheets

FOREIGN PATENT DOCUMENTS

| | | |
|---|---|---|
| EP | 0 834 991 A1 | 4/1998 |
| GB | 2 345 598 A | 7/2000 |
| JP | 10-224704 | 8/1998 |
| JP | 11-146289 | 5/1999 |
| JP | 2000-332578 | 11/2000 |

OTHER PUBLICATIONS

Examination Report Under Section 18(3) from U.K. Patent Office, dated Aug. 2, 2004 for the counterpart U.K. patent application.

Notice of Rejection from Japanese Patent Office dated Dec. 21, 2005 in corresponding Japanese patent application JP2001-012723.

* cited by examiner

DIGITAL BROADCASTING RECEIVER AND CHANNEL INFORMATION REGISTRATION PROCESSING METHOD IN DIGITAL BROADCASTING RECEIVER

BACKGROUND OF THE INVENTION

1. Field of the Invention

The present invention relates to a digital broadcasting receiver for receiving digital TV broadcasting and digital audio broadcasting, and a channel information registration processing method in the digital broadcasting receiver.

2. Description of the Prior Art

In conventional television broadcasting receivers, channel information such as a receivable channel number and service information have been registered in the receiver by making a channel scan (a search) for each channel. Conventionally, within a range of channels which can be received by a tuner, all the channels including the channel on which no programs are actually broadcast have been successively searched for the channel information.

In order to acquire the service information, it is necessary to wait until a demodulation/FEC (Forward Error Correction) circuit is locked. When the channel on which no programs are actually broadcast is searched, the demodulation/FEC circuit is not locked. Therefore, it has been conventionally judged whether or not the demodulation/FEC circuit is locked for a predetermined time period, to search the subsequent channel if the demodulation/FEC circuit is not locked. Conventionally, it has been thus judged whether or not the demodulation/FEC circuit is also locked with respect to the channel on which no programs are actually broadcast. Accordingly, it takes much time to register the channel information.

SUMMARY OF THE INVENTION

An object of the present invention is to provide a digital broadcasting receiver capable of shortening a time period required to register channel information, and a channel information registration processing method in the digital broadcasting receiver.

A digital broadcasting receiver according to the present invention is characterized by comprising first means for performing pre-scan processing for successively tuning in on channels previously set, to examine whether or not a received signal on each of the channels is of a predetermined quality or more, and temporarily registering the channel numbers of the channels on which the received signals are of the predetermined quality or more in a storage device as receivable channel candidates; and second means for performing normal scan processing for successively tuning in on the receivable channel candidates temporarily registered in the storage device by the first means, to acquire and register necessary channel information.

The pre-scan processing may be performed a plurality of number of times in the first means. It is preferable that the pre-scan processing is performed in a state where the gain of an automatic gain control amplifier in a tuner is fixed.

It is judged in the first means whether or not the received signal is of the predetermined quality or more on the basis of judgment whether or not received power is more than a predetermined value, for example.

Examples of the channel information include a receivable channel number, service information in the case of a channel in digital broadcasting, and a distinction between the channel in digital broadcasting and a channel in analog broadcasting.

A channel information registration processing method in a digital broadcasting receiver according to the present invention is characterized by comprising a first step of performing pre-scan processing for successively tuning in on channels previously set, to examine whether or not a received signal on each of the channels is of a predetermined quality or more, and temporarily registering the channel numbers of the channels on which the received signals are of the predetermined quality or more in a storage device as receivable channel candidates; and a second step of performing normal scan processing for successively tuning in on the receivable channel candidates temporarily registered in the storage device in the first step, to acquire and register necessary channel information.

The pre-scan processing may be performed a plurality of number of times in the first step. It is preferable that the pre-scan processing in the first step is performed in a state where the gain of an automatic gain control amplifier in a tuner is fixed.

It is judged in the first step whether or not the received signal is of the predetermined quality or more on the basis of judgment whether or not received power is more than a predetermined value, for example.

Examples of the channel information include a receivable channel number, service information in the case of a channel in digital broadcasting, and a distinction between the channel in digital broadcasting and a channel in analog broadcasting.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described.

Figure 1:
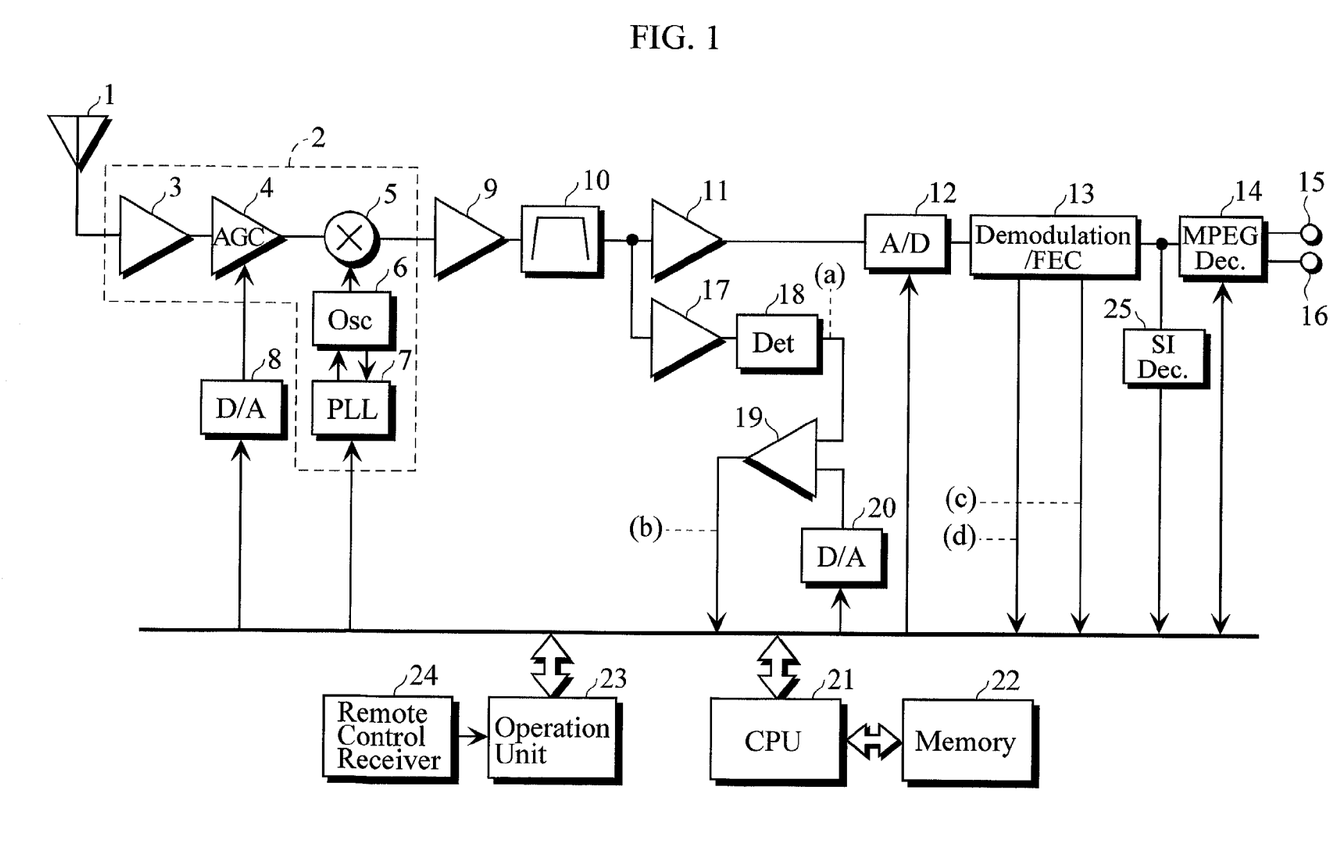
FIG. 1 is a block diagram showing the configuration of a digital broadcasting receiver.

FIG. 1 illustrates the configuration of a digital broadcasting receiver.

In FIG. 1, reference numeral 1 denotes a receiving antenna. Reference numeral 2 denotes a tuner for tuning in on an RF (Radio Frequency) signal from the antenna 1 and converting the RF signal tuned in on into an IF (Intermediate Frequency) signal.

Reference numeral 3 denotes an initial-stage amplifier. Reference numeral 4 denotes an AGC (Automatic Gain Control) amplifier whose gain is variable by a control voltage from the exterior. Reference numeral 5 denotes a down converter for converting the received RF signal into an IF signal that is a difference frequency signal between a local frequency signal generated in a voltage controlled oscillator 6 and the received RF signal. Reference numeral 7 denotes a PLL (Phase-Locked Loop) circuit for controlling the frequency of an output signal of the voltage controlled oscillator 6 to a desired predetermined frequency by channel selection data from a CPU 21. Reference numeral 8 denotes a D/A (Digital-to-Analog) converter for generating a gain control voltage of the AGC amplifier 4 by control data from the CPU 21.

Reference numerals 9, 11, and 17 denote intermediate frequency amplifiers. Reference numeral 10 denotes a band pass filter for extracting the IF signal from a signal whose frequency has been changed (an output signal of the intermediate frequency amplifier 9). Reference numeral 12 denotes an A/D (Analog-to-Digital) converter for converting the IF signal outputted from the intermediate frequency amplifier 11 into digital data. Reference numeral 13 denotes a demodulation/FEC circuit for demodulating the received signal which has been converted into the digital data by the A/D converter 12 and correcting errors. Reference numeral 14 denotes an MPEG (Motion Picture Expert Group) decoder for converting a transport stream in an MPEG format which has been demodulated by the demodulation/FEC circuit 13 into a base band signal.

The demodulation/FEC circuit 13 outputs a locking signal (d) when it normally receives a digital broadcast wave. Further, the demodulation/FEC circuit 13 comprises the function of judging whether or not the received broadcast wave is an analog broadcast wave on the basis of judgment whether or not a horizontal synchronizing signal of an analog modulated wave can be extracted. The demodulation/FEC circuit 13 outputs an analog broadcast wave flag (c) when it normally receives the analog broadcast wave.

Reference numeral 15 denotes a base band video signal output terminal. Reference numeral 16 denotes a base band audio signal output terminal. Reference numeral 18 denotes a detection circuit for detecting the IF signal outputted from the intermediate frequency amplifier 17. Reference numeral 19 denotes a comparator for comparing the level of the IF signal, which has been detected, obtained by the detection circuit 18 with a reference voltage in order to judge whether or not a channel tuned in on is receivable. Reference numeral 20 denotes a D/A converter for converting the data from the CPU 21 into a voltage to generate the reference voltage of the comparator 19.

Reference numeral 21 denotes a CPU. Reference numeral 22 denotes a memory. Reference numeral 23 denotes an operation unit operated by a viewer. Reference numeral 24 denotes a remote control receiver for receiving a signal from a remote control (not shown) and issuing a command to the operation unit 23. Reference numeral 25 denotes an SI (Service Information) decoder for demodulating service information multiplexed on each physical channel.

Figure 2:
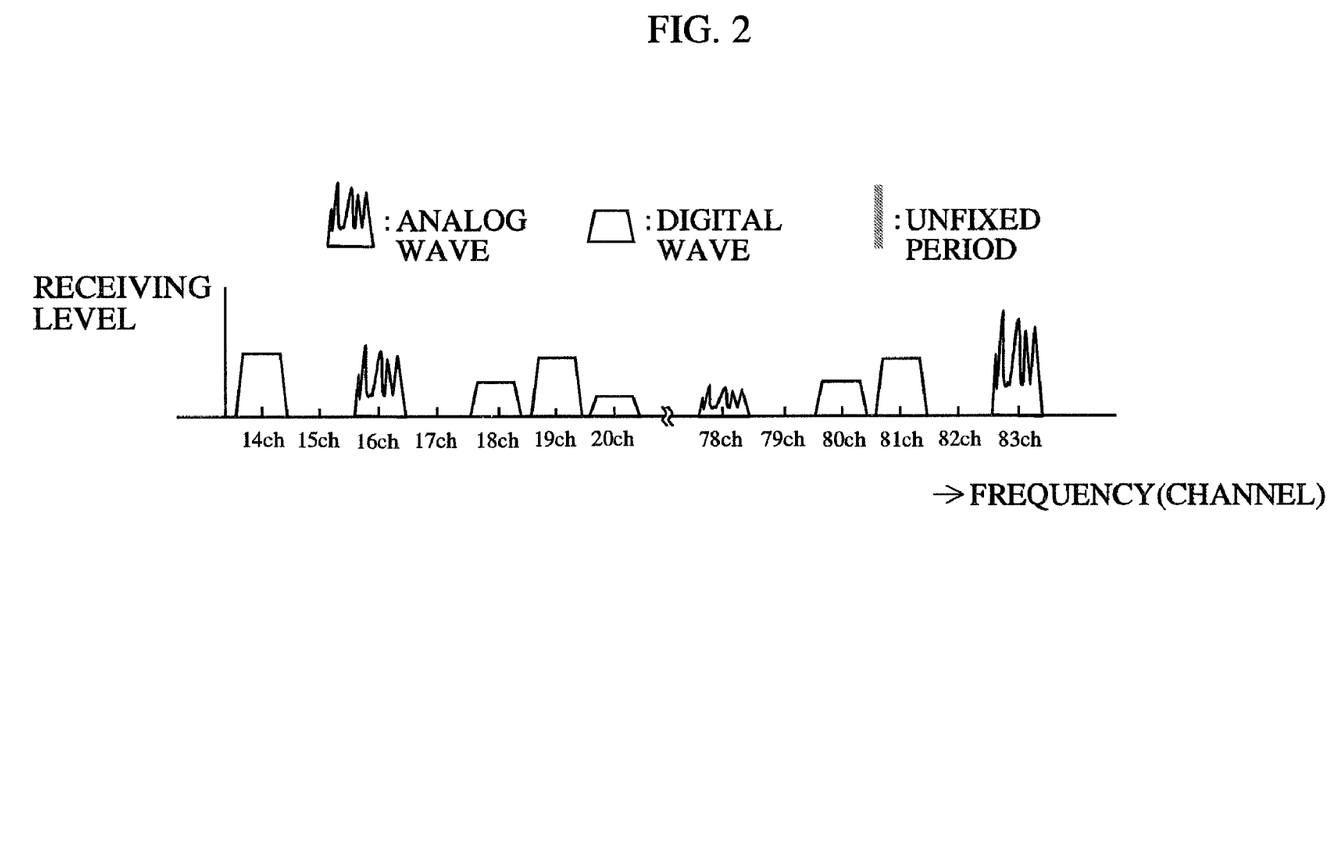
FIG. 2 is a timing chart showing an example of a receiving spectrum in a UHF-TV band.

FIG. 2 illustrates an example of a receiving spectrum in a UHF (Ultrahigh Frequency)-TV band.

Figure 3:
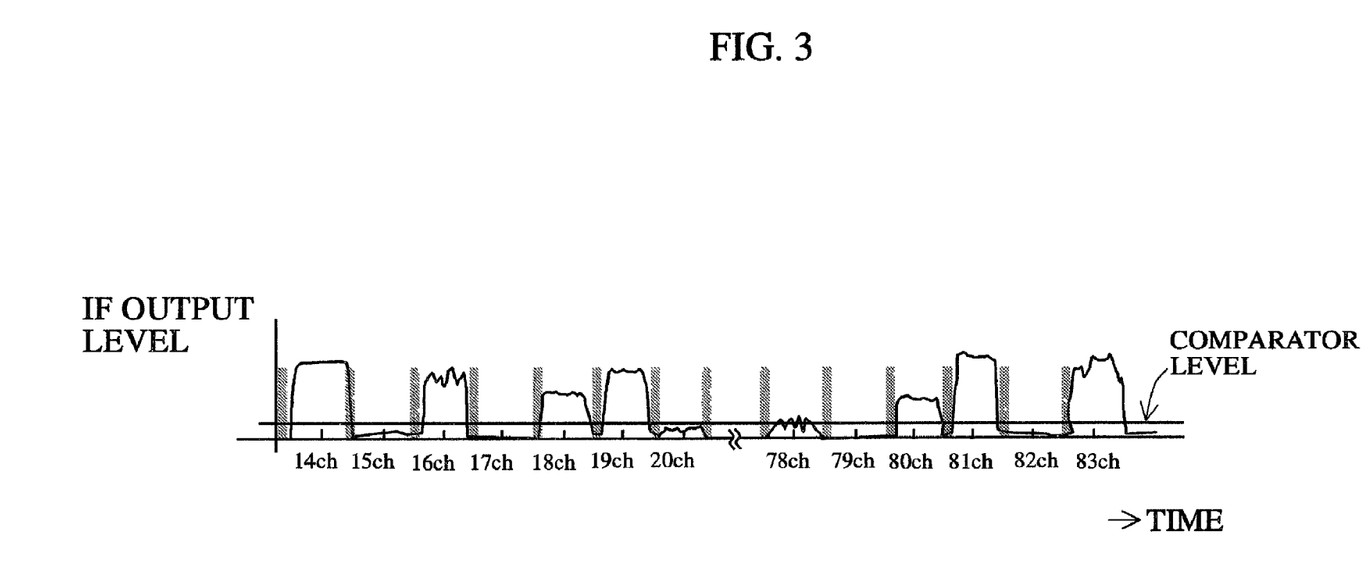
FIG. 3 is a timing chart showing a signal waveform after detection in a case where a channel scan is made.

FIG. 3 illustrates a signal waveform (a voltage waveform of a signal (a)) after the detection in a case where a channel scan is made.

Figure 4:
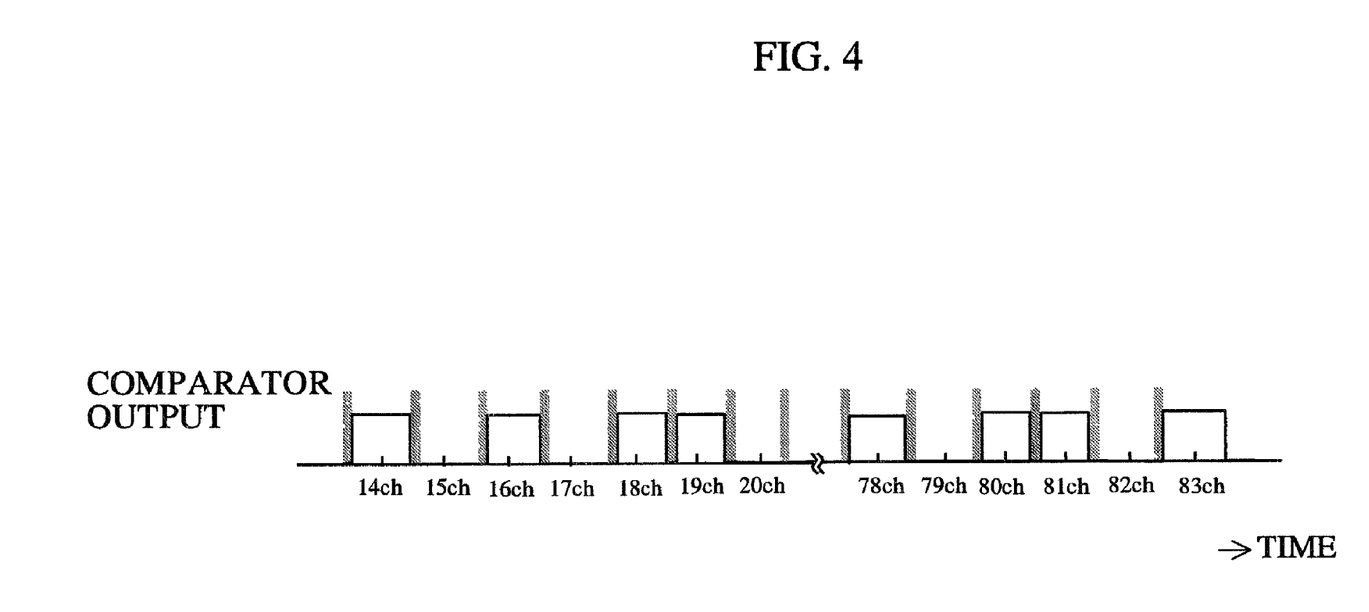
FIG. 4 is a timing chart showing a signal indicating whether or not a channel tuned in on is receivable.

FIG. 4 illustrates a signal indicating whether or not a channel tuned in on is receivable, that is, an output signal (a signal (b)) of the comparator 19.

Figure 5:
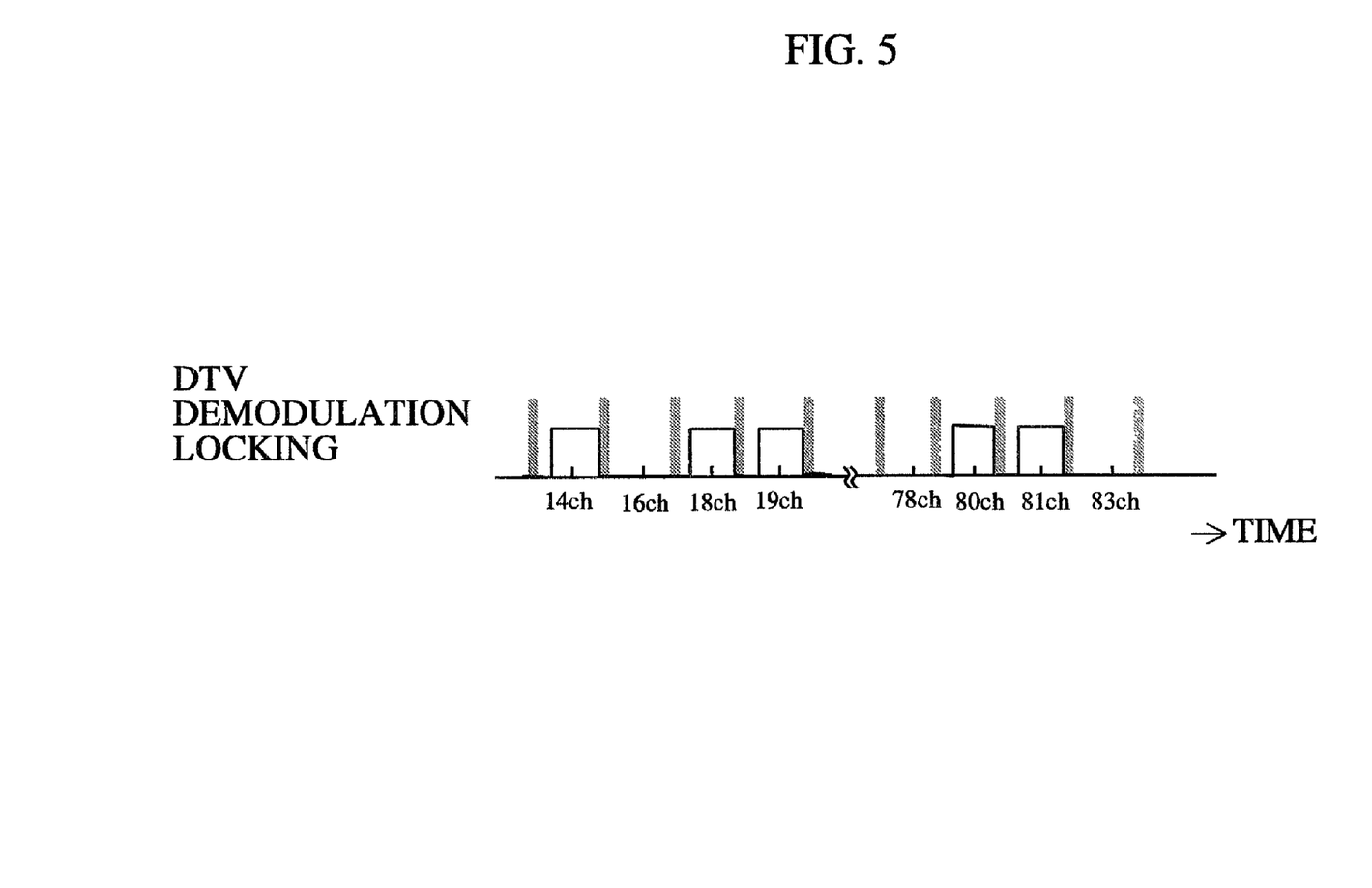
FIG. 5 is a timing chart showing a demodulation locking signal indicating that a digital broadcast wave is normally received and demodulated.

FIG. 5 illustrates a demodulation locking signal (a signal (d)) indicating that a digital broadcast wave is normally received and demodulated.

Figure 6:
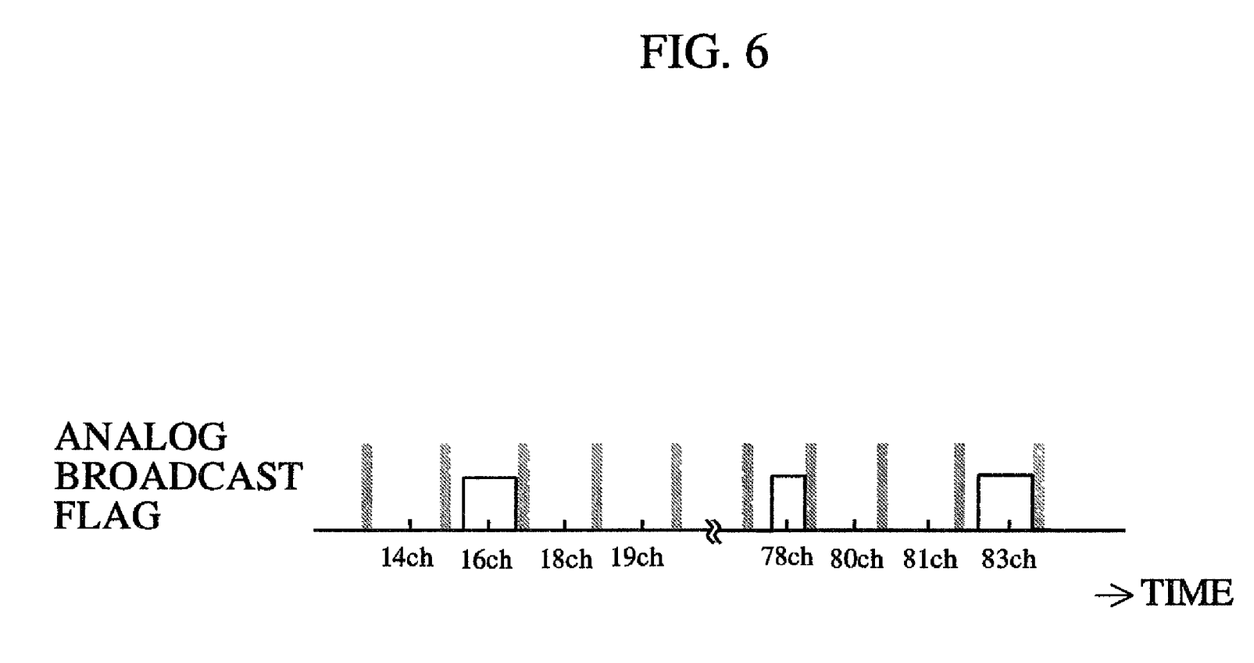
FIG. 6 is a timing chart showing a flag indicating that a received signal is an analog broadcast wave.

FIG. 6 illustrates a flag indicating that a received signal is an analog broadcast wave, which is a waveform of a signal (c) outputted from the demodulation/FEC circuit 13.

In a case such as a case where an antenna or a receiver is installed or a case where new broadcasting stations which can receive signals are opened, it is necessary to previously examine the broadcasting station in an area where the receiver is installed and register in the receiver channel information such as a receivable channel and service information in order for a viewer to easily select the receivable channel. In registering the channel information, the viewer turns on the power to the receiver, and selects a channel scan mode by an initial menu in the operation unit 23.

Figure 7:
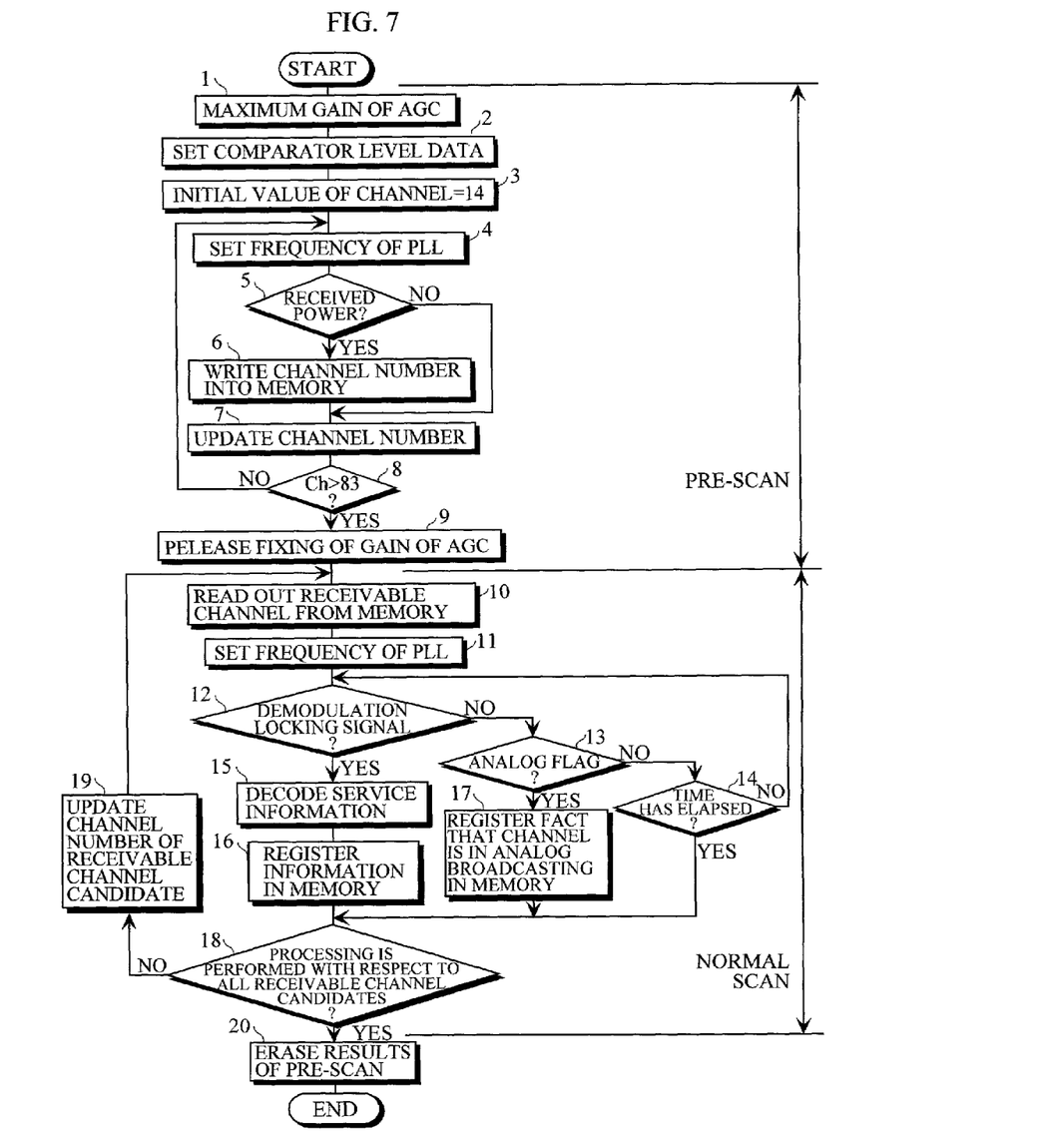
FIG. 7 is a flow chart showing the procedure for channel information registration processing.

FIG. 7 shows the procedure for channel information registration processing performed by the CPU 21 in a case where the channel scan mode is selected.

The channel information registration processing comprises pre-scan processing and normal scan processing. Description is first made of the pre-scan processing.

When the channel scan mode is selected, the CPU 21 feeds data to the D/A converter 8 such that the gain of the AGC amplifier 4 reaches its maximum (step 1). Further, the CPU 21 feeds data to the D/A converter 20 in order to feed to the comparator 19 a reference voltage for judging whether or not a channel tuned in on is receivable (step 2).

Furthermore, the CPU 21 sets an initial value of the channel tuned in on (step 3). As the initial value, the minimum value in a channel range, that is, Channel 14 is set in the case of U.S. UHF. In order to tune in on the set channel, channel selection data is fed to the PLL circuit 7 (step 4).

A radio wave received in the antenna 1 is amplified by the initial-stage amplifier 3 in the tuner 2, is further amplified by the AGC amplifier 4 whose gain has been set to its maximum by an instruction from the CPU 21, and is then fed to the down converter 5. A local signal generated in the voltage controlled oscillator 6 is fed to the down converter 5.

An output signal of the down converter 5 is fed to the band pass filter 10 through the amplifier 9. An IF signal on a desired channel tuned in on is outputted from the band pass filter 10. The IF signal is amplified by the amplifier 17, and is then fed to the comparator 19 through the detection circuit 18. In the comparator 19, an output voltage of the detection circuit 18 and the reference voltage outputted from the D/A converter 20 are compared with each other in order to judge whether or not the channel tuned in on is receivable.

A high-level signal indicating that the channel tuned in on is receivable is outputted from the comparator 19 when the output voltage of the detection circuit 18 is more than the reference voltage, and a low-level signal indicating that the channel tuned in on is not receivable is outputted from the comparator 19 when the output voltage of the detection circuit 18 is not more than the reference voltage. The CPU 21 judges whether or not the channel tuned in on is receivable on the basis of the output of the comparator 19 (step 5).

The CPU 21 writes, when it judges that the channel tuned in on is receivable, the channel number of the channel into the memory 22 as a receivable channel candidate (step 6), and then updates the channel number of the channel tuned in on to the subsequent channel number (step 7). On the other hand, the CPU 21 updates, when it judges that the channel tuned in on is not receivable, the channel number of the channel tuned in on to the subsequent channel number without writing the channel number into the memory 22 as a receivable channel candidate (step 7).

The CPU 21 judges whether or not the channel number which has been updated in the step 7 exceeds its upper limit value ("83" in this example) (step 8). Unless the updated channel number exceeds the upper limit value, the program is returned to the step 4, to perform the same processing. When the updated channel number exceeds the upper limit value, the pre-scan processing is terminated, to proceed to the normal scan processing.

When a digital broadcast wave of a predetermined quality or more is received, a locking signal (a signal (d) in FIG. 1) indicating that demodulation is possible is outputted from the demodulation/FEC circuit 13. In the pre-scan processing, however, it is judged whether or not the channel tuned in on is receivable without examining the locking signal. In the pre-scan processing, a waveform as shown in FIG. 4 is obtained from the comparator 19.

The normal scan processing will be described.

In the normal scan processing, the CPU 21 releases the fixing of the gain of the AGC amplifier 4 (step 9). Consequently, the gain of the AGC amplifier 4 is controlled to the most suitable gain in conformity with the level of a received signal, as at the time of normal receiving.

The CPU 21 reads out one of the channel numbers of the receivable channel candidates which have been stored in the memory 22 by the pre-scan processing (step 10). In the examples shown in FIGS. 3 and 4, Channels 14, 16, 18, 19, . . . , 78, 80, 81, 83 are stored in the memory 22 as receivable channel candidates. Accordingly, Channel 14 is first read out.

The CPU 21 feeds data to the PLL circuit 7 in order to tune in on the channel whose channel number has been read out of the memory 22 (step 11). When the channel is tuned in on, an IF signal corresponding to the channel tuned in on is outputted from the tuner 2 and is converted into digital data by the A/D converter 12. The digital data is then fed to the demodulation/FEC circuit 13, where it is subjected to demodulation and error correction.

When the digital broadcast wave is normally received, as described above, the locking signal (d) is outputted from the demodulation/FEC circuit 13. When the analog broadcast wave is normally received, an analog broadcast wave flag (c) is outputted from the demodulation/FEC circuit 13.

The CPU 21 judges whether or not the locking signal (d) is outputted from the demodulation/FEC circuit 13 (step 12), whether or not the analog broadcast wave flag (c) is outputted from the demodulation/FEC circuit 13 (step 13), and whether or not a predetermined time period has elapsed since the channel was tuned in on in the step 11 (step 14).

The CPU 21 decodes, when it receives the locking signal (d) from the demodulation/FEC circuit 13 (YES in step 12), service information from demodulation data by the SI decoder 25 (step 15), and registers in the memory 22 the decoded service information as service information corresponding to the channel tuned in on (step 16). Thereafter, the program proceeds to the step 18.

The CPU 21 registers, when it receives the analog broadcast wave flag (c) from the demodulation/FEC circuit 13 (YES in step 13), the fact that the channel tuned in on is a channel in analog broadcasting is registered in the memory 22 (step 17). The program proceeds to the step 18.

When the CPU 21 judges that a predetermined time period has elapsed since the channel was tuned in on in the step 11 without receiving the locking signal (d) and the analog broadcast wave flag (c) from the demodulation/FEC circuit 13, the program proceeds to the step 18.

In the step 18, it is judged whether or not the processing in the step 10 and the subsequent steps is performed with respect to all the receivable channel candidates in the memory 22. When the processing in the step 10 and the subsequent steps is not performed with respect to all the receivable channel candidates in the memory 22, the channel number is updated to the channel number of the subsequent receivable channel candidate (step 19). Thereafter, the program is returned to the step 10.

When the processing in the step 10 and the subsequent steps is performed with respect to all the receivable channel candidates in the memory 22, the channel numbers of the receivable channel candidates which have been stored in the memory 22 in the pre-scan processing are erased (step 20). Thereafter, the normal scan processing is terminated.

Although in the above-mentioned embodiment, the pre-scan processing is performed only once, the pre-scan processing may be performed a plurality of times. When the pre-scan processing is performed a plurality of times, it can be judged whether or not a channel is a channel which is judged to be stably receivable or a channel, inferior in signal receiving quality, whose receiving level changes with time by fading or the like even if it is judged to be a receivable channel candidate. With respect to the channel inferior in signal receiving quality, it is possible to shorten the predetermined time period in the step 14 at the time of the normal scan processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver comprising:
   first means for performing pre-scan processing for successively tuning in on channels previously set, to examine whether or not a received signal on each of the channels is of a predetermined quality or more, and temporarily registering the channel numbers of the channels on which the received signals are of the predetermined quality or more in a storage device as receivable channel candidates; and
   second means for performing normal scan processing for successively tuning in on the receivable channel candidates temporarily registered in the storage device by the first means, to acquire and register necessary channel information,
   wherein the pre-scan processing is performed in a state where the gain of an automatic gain control amplifier in a tuner is fixed.

2. The digital broadcasting receiver according to claim 1, wherein the pre-scan processing is performed a plurality of number of times in the first means.

3. The digital broadcasting receiver according to claim 1, wherein it is judged in the first means whether or not the received signal is of the predetermined quality or more on the basis of judgment whether or not received power is more than a predetermined value.

4. The A digital broadcasting receiver comprising:
   first means for performing pre-scan processing for successively tuning in on channels previously set, to examine whether or not a received signal on each of the channels is of a predetermined quality or more, and temporarily registering the channel numbers of the channels on which the received signals are of the predetermined quality or more in a storage device as receivable channel candidates; and second means for performing normal scan processing for successively tuning in on the receivable channel candidates temporarily registered in the storage device by the first means, to acquire and register necessary channel information, wherein the channel information include a receivable channel number, service information in the case of a channel in digital broadcasting, and a distinction between the channel in digital broadcasting and a channel in analog broadcasting.

5. A channel information registration processing method in a digital broadcasting receiver comprising:

a first step of performing pre-scan processing for successively tuning in on channels previously set, to examine whether or not a received signal on each of the channels is of a predetermined quality or more, and temporarily registering the channel numbers of the channels on which the received signals are of the predetermined quality or more in a storage device as receivable channel candidates; and a second step of performing normal scan processing for successively tuning in on the receivable channel candidates temporarily registered in the storage device in the first step, to acquire and register necessary channel information, wherein the pre-scan processing in the first step is performed in a state where the gain of an automatic gain control amplifier in a tuner is fixed.

6. The channel information registration processing method in the digital broadcasting receiver according to claim 5, wherein the pre-scan processing is performed a plurality of number of times in the first step.

7. The channel information registration processing method in the digital broadcasting receiver according to claim 5, wherein it is judged in the first step whether or not the received signal is of the predetermined quality or more on the basis of judgment whether or not received power is more than a predetermined value.

8. A channel information registration processing method in a digital broadcasting receiver comprising:

a first step of performing pre-scan processing for successively tuning in on channels previously set, to examine whether or not a received signal on each of the channels is of a predetermined quality or more, and temporarily registering the channel numbers of the channels on which the received signals are of the predetermined quality or more in a storage device as receivable channel candidates; and a second step of performing normal scan processing for successively tuning in on the receivable channel candidates temporarily registered in the storage device in the first step, to acquire and register necessary channel information, wherein the channel information include a receivable channel number, service information in the case of a channel in digital broadcasting, and a distinction between the channel in digital broadcasting and a channel in analog broadcasting.

* * * * *